Jan. 29, 1957  C. H. BORNER  2,779,039
APPARATUS FOR MANUFACTURING LOCKING DEVICES
Original Filed Dec. 18, 1950  4 Sheets-Sheet 2
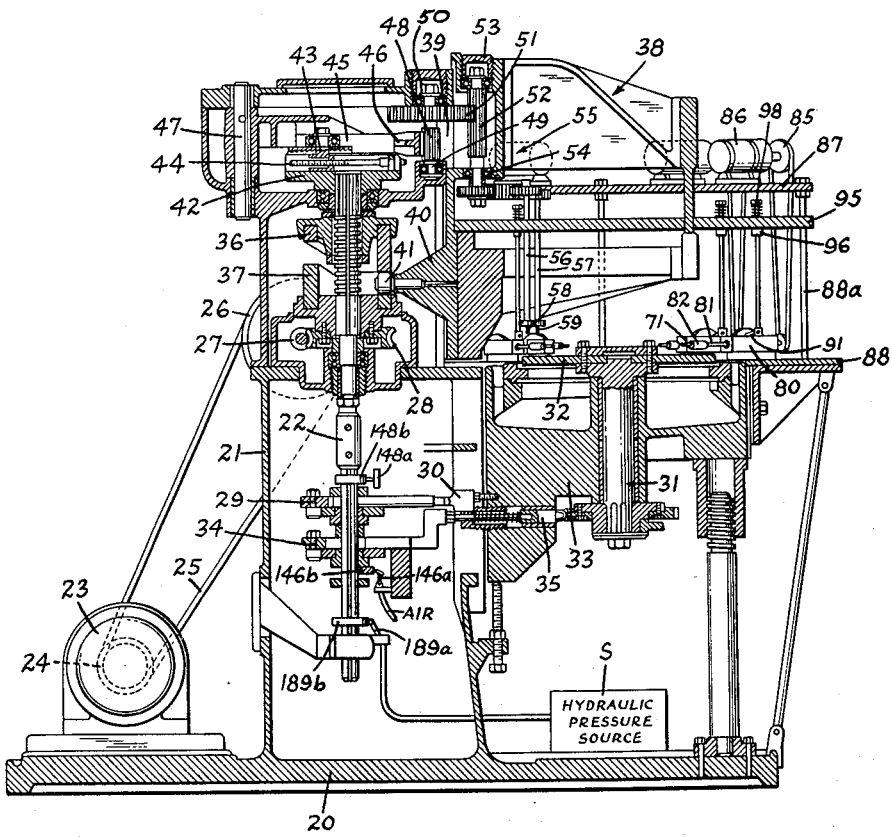
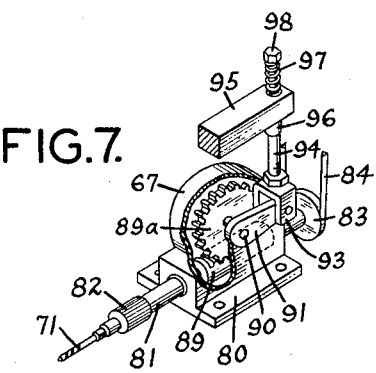
INVENTOR.
CARL H. BORNER
BY
HIS ATTORNEYS.

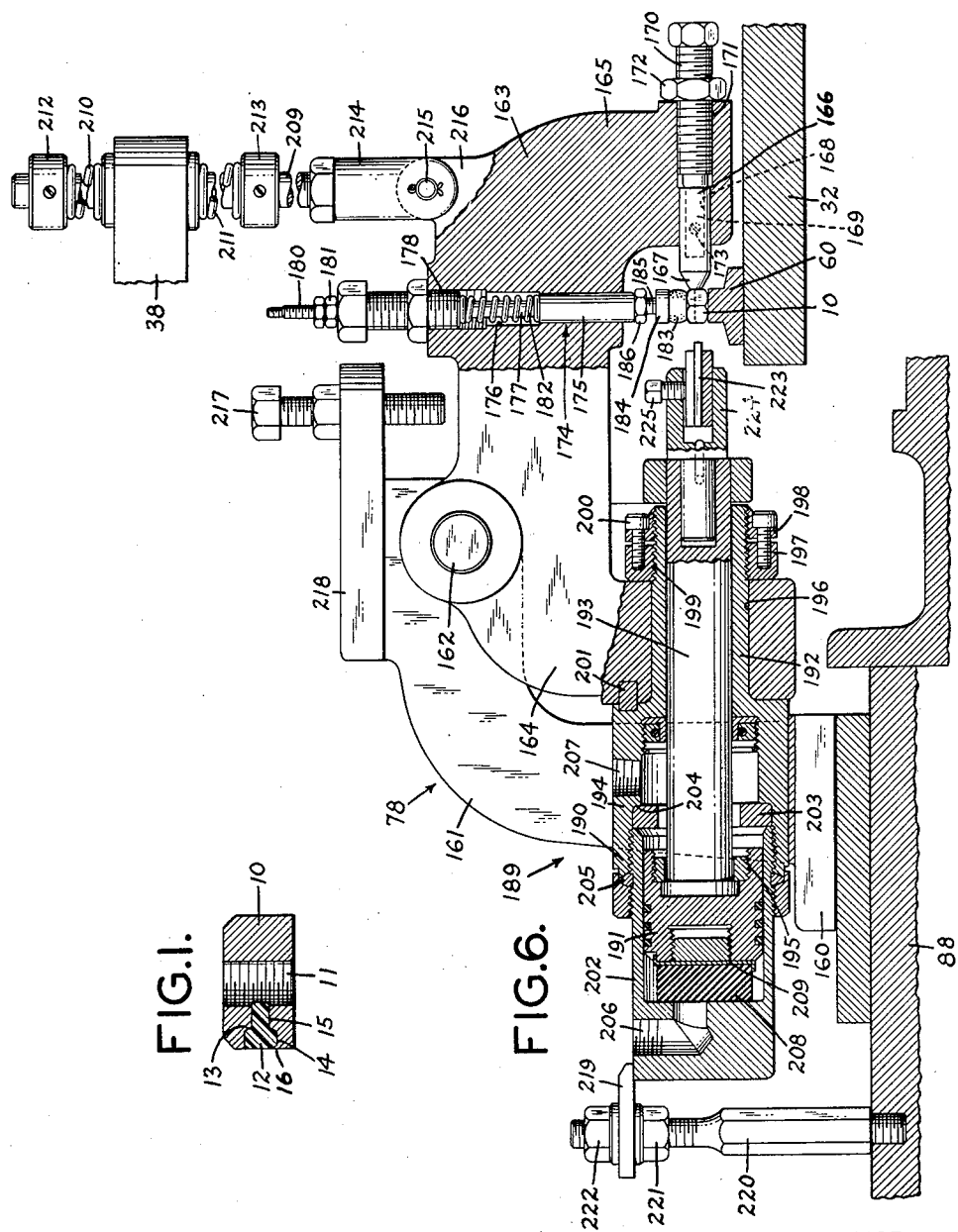

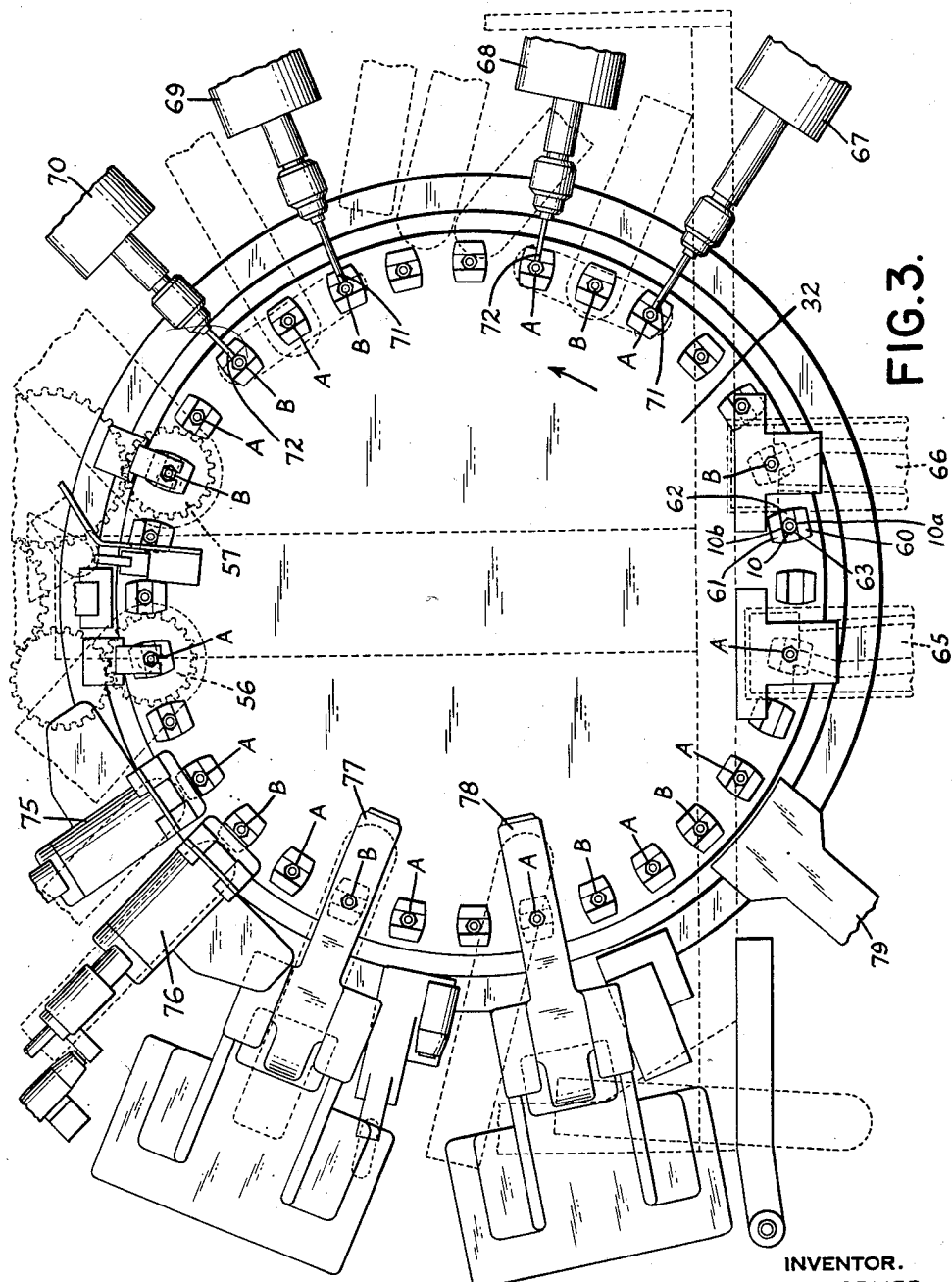

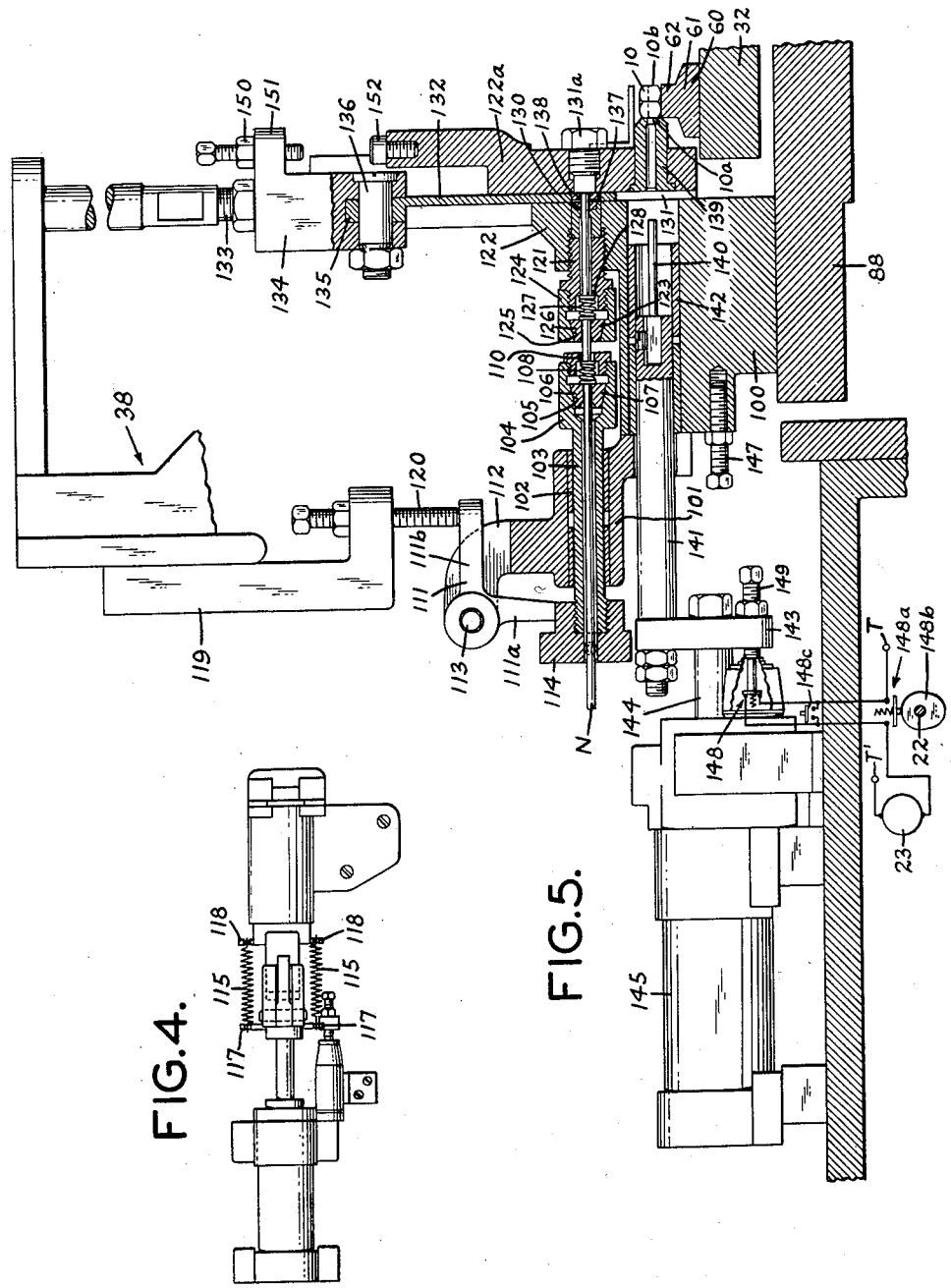

United States Patent Office 2,779,039
Patented Jan. 29, 1957

2,779,039

APPARATUS FOR MANUFACTURING LOCKING DEVICES

Carl H. Borner, Dumont, N. J., assignor to The Nylok Corporation, New York, N. Y., a corporation of Delaware Original application December 18, 1950, Serial No. 201,468. Divided and this application February 19, 1954, Serial No. 411,438

7 Claims. (Cl. 10—72)

The invention relates to apparatus for manufacturing lock nuts and the like and it relates more particularly to automatic machine tools for converting nut blanks into lock nuts of the type wherein a plug of "nylon" or similar resilient material inserted in a hole in the wall of the nut engages and is deformed by the threads of a bolt or the like to prevent turning and loosening of the nut by vibration or other unintentional causes.

This is a division of my U. S. application, Serial No. 201,468, filed December 18, 1950, now abandoned.

In accordance with the present invention a nut blank having a central unthreaded opening is converted into a completed lock nut of the type described above by forming a hole through one side of the nut blank, the hole having a shoulder between its ends to act as a retaining member for the nylon or other plug. After the hole is formed in the nut blank, the central opening of the nut is threaded or tapped, which operation also removes any burrs or roughness that may be left during the formation of the hole to receive the plug. At the conclusion of the threading or tapping operation, the plug of nylon or similar resilient material is forced into the hole in the nut so that the plug seats against the shoulder and is deformed enough to protrude into the threaded opening in the nut. Thereafter, the metal around the outer end of the hole is peened or punched to overlie at least partially the outer end of the plug to secure the plug permanently in position.

In accordance with the invention, I have provided an automatic machine tool whereby all of the operations on the nut can be accomplished automatically and finished lock nuts of the type described can be produced quickly and in large volume with a minimum of attention on the part of the operator of the machine.

Generally, the new machine tool includes a table or support which is arranged to be indexed step-by-step past a plurality of automatically operated tools for operating on the nut blanks. The table is provided with a plurality of fixtures around its periphery, each of which is adapted to receive an unthreaded nut blank in such a position that one flat face of the nut is directed outwardly. As the table is indexed step-by-step, the nut blanks are introduced in pairs into the fixtures and are moved past automatically actuated drills which drill a first hole partially through the nut with one drill and then finish drilling the hole through the wall of the nut with a smaller drill to thereby form an outwardly facing shoulder in the hole in the nut. As the table is indexed, the nuts move in pairs beneath automatically actuated tapping spindles which tap or thread the center opening in the nuts. The drilled and tapped nuts are advanced in pairs in front of plug forming and inserting devices which sever small plugs from an advancing rod of nylon or similar resilient material and force these plugs into holes in the walls of the nuts. The plugs are forced into the holes with sufficient force to cause the plugs to be deformed so that their inner ends project a short distance into the threaded opening in the nut. The nut blanks are again advanced in pairs in front of a pair of punch members which peen over the metal around the outer ends of the holes containing the plugs and thereby anchor or secure the plugs permanently in the nuts.

The above-described machine tool is constructed and arranged so that the indexing of the work table and the operation of the several tools are properly timed in order to accomplish their several functions in the proper order and with a minimum of attention so that high speed production of the lock nuts is obtained.

For a better understanding of the present invention, reference may be had to the accompanying drawings in which:

Fig. 1 is a view in vertical cross section through a typical form of lock nut produced in accordance with the method and by means of a machine tool embodying the invention;

Fig. 2 is a view in vertical section through a machine tool of the type embodying the present invention;

Fig. 3 is a plan view of the work supporting table and illustrating the arrangement of the several tools for co-operation with the work table;

Fig. 4 is a plan view of novel device for forming and inserting the nylon or resilient plugs in the lock nuts;

Fig. 5 is a view in elevation and partly in section and broken away of the plug cutting and inserting device shown in Fig. 4;

Fig. 6 is a view in elevation and partly in section and broken away of a peening punch for peening the metal of the nut to retain the lock plugs in the nut; and Fig. 7 is a perspective view, with parts broken away, of a drilling tool for drilling holes in the nut blanks.

The present invention will be described using a machine tool of known type as a basic structure upon which the completed machine is built. The basic machine tool may be an automatic twin spindle tapping machine manufactured by the Bodine Corporation of Bridgeport, Connecticut, and identified in their catalog, copyrighted 1945, as the No. 48 tapping machine.

Referring now to Fig. 1 of the drawings, the type of article to be produced with my new machine is a nut member 10 having an internally threaded opening 11 for receiving a bolt, screw or the like and having positioned in its side wall a plug 12 of nylon or similar material. The plug is retained in position by means of a shoulder 13 formed at the intersection of a larger bore 14 and a smaller inwardly positioned bore 15 and by means of peened over edges 16 engaging the outer end of the plug 12.

The operations to produce this nut by means of the machine tool described hereinafter consist, in sequence, in drilling the larger bore 14 partially through the nut, then drilling the smaller bore 15 to complete the hole through the side wall of the nut, tapping the nut to form the threads in the opening 11, inserting a plug of uniform cross section into the hole with sufficient force to deform it and cause it to assume the shape shown in Fig. 1 and thereafter peening the metal around the bore 14 to form the peened over edges 16 to retain the plug in position.

As indicated above, the machine tool shown in Fig. 2 of the drawing is based on the Bodine No. 48 tapping machine. Inasmuch as this machine is well known both structurally and in its operation, only a brief description of its features are given herein. The tapping machine includes a base frame member 20 which carries an upright hollow casing 21 which houses and supports the main drive shaft 22 of the machine. The drive shaft 22 is driven by means of an electric motor 23 mounted on the base frame member 20. The motor 23 is connected by means of a pulley 24, a multiple belt 25, a pulley 26, and a worm 27 to the worm gear 28 fixed to the drive shaft 22. The drive shaft 22 drives by means of a suitable crank 29 and a pawl and ratchet mechanism 30, a vertical shaft 31 which carries on its upper end a disc-like work supporting table 32. Shaft 31 is rotatably mounted in an extension 33 from the casing 21 and is provided with adjusting means for regulating its vertical position.

The shaft 22 also drives a crank 34 which actuates a lock and release mechanism 35 to lock alternately the table against rotation and release it for rotation by means of the pawl-ratchet drive.

The upper end of the drive shaft 22 carries a pair of opposed cam members 36 and 37 for driving a vertically reciprocating cross head member 38. The cross head member is slidable in vertical tracks 39 in the upper end of the casing 21 so that the cross head can move toward and away from the work supporting table 32. The inwardly extending bracket 40 on the cross head 38 carries a cam roller 41 which engages between the cam members 36 and 37 so that rotation of these cam members produces an up and down movement of the cross head 38 with a slight dwell at the top and bottom of its stroke.

Tapping means for tapping or threading a pair of nuts or other elements are carried by and movable with the cross head and are driven as follows. At the uppermost end of the shaft 22 is a crank disc 42 carrying a crank pin 43 which may be adjusted radially of the disc 42 by means of a threaded shaft 44. The crank pin engages in a slot 45 in a gear sector 46 which is pivotally supported at its left-hand end on the vertical pivot pin or shaft 47 mounted in the upper end of the casing 21. Rotation of the shaft 22 causes oscillation of the gear sector 46 and back and forth rotation of the barrel gear 48 which meshes with the sector. The barrel gear is mounted in suitable bearings 49 and 50 in the casing 21 and has a larger gear 51 fixed to it. The gear 51 meshes with an elongated gear 52 mounted in bearings 53 and 54 in the upper end of the cross head 38 so that the gears 51 and 52 remain in mesh during up and down movement of the cross head 38.

The gear 52 is connected by means of a suitable gear train 55 with a pair of tapping spindles 56 and 57 provided with chucks at their lower ends to receive the tapping or threading tools 58 and 59. The tapping spindles 56 and 57 move with the cross head and their gear ratio with respect to the movement of the cross head is such that upon downward movement of the cross head, as described, they will cut threads of predetermined size in the work below them and will retract due to the reverse rotation imparted to them by oscillating movement of the sector 46. Adjustment of the crank pin 43 enables the rotation of the spindles 56 and 57 to be adjusted to various thread sizes and pitches.

In accordance with the present invention, the above-described machine tool is modified as follows to render it suitable for the production of nuts of the type disclosed in Fig. 1. The tapping spindles 56 and 57 are shown in dotted lines in Fig. 3 in their relation to the work supporting table 32. The work supporting table is provided with a plurality of fixtures 60 arranged in a circle adjacent the edge of the table 32. These fixtures, as best shown in Figs. 3, 5 and 6, include a flared base portion 61 screwed or otherwise secured to the table 32 and an upright flange portion 62 having a notch 63 in it adapted to engage the two adjacent faces on opposite sides of the nut blank 10 so that the flat inner and outer faces 10a and 10b of the nut are exposed. The nuts are held firmly in position against inward or outward displacement but they can be removed readily through the top of the notch 63 in the fixture 60.

The nuts are fed in pairs into the fixtures by means of a pair of automatic nut feeding chutes 65 and 66 of conventional type. As shown in Fig. 3, the chutes 65 and 66 are spaced three fixtures apart.

The table 32 is arranged to be indexed a distance equal to the spacing between three fixtures at each movement of the pawl 30 and the nuts are fed into the fixtures in suitably timed relation, as described.

As illustrated, the work table carries thirty-two of the fixtures 60 and sixteen steps are required for a complete revolution. As the nuts are carried by the table 32 in a counterclockwise direction, as indicated by the arrow in Fig. 3, they pass by stations at which the drills 67, 68, 69 and 70 are located. The drills 67 and 69 carry drill bits 71 suitable for drilling the larger bore 14 in the nut, as shown in Fig. 1. The drills 68 and 70 carry drill bits 72 of a size to drill the smaller hole 15 in the nut 10, as shown in Fig. 1.

The indexing of the table 32 brings the nut blanks A introduced from the hopper 65 into alignment successively with the drills 67 and 68 while the nut blanks B introduced from the chute 66 into the fixtures are never aligned with the drills 67 and 68 but do come into alignment in succession with the drills 69 and 70. Likewise, the nuts drilled by means of the drills 67 and 68 are never aligned with the drills 69 and 70 because of the two-fixture indexing of the work table 32.

The nuts A introduced through the chute 65 come in succession beneath the tapping spindle 56 while the nuts B introduced from the chute 66 come beneath the tapping spindle 57 and are tapped at these stations. The nuts then travel in front of the plug forming and inserting devices 75 and 76, to be described hereinafter, and then into alignment with the punching or peening devices 77 and 78 after which they are indexed further and ejected at the chute 79. The stations at which the nuts A and B are drilled, tapped, plugged and peened are indicated in Fig. 3 by the letters A and B.

Fig. 7 discloses a well-known type of automatic drill like any of the drills 67 to 70. Only the drill 67 will be described herein. This automatic drill includes a casing 80 which houses and supports rotatably the drill spindle which is provided at its inner end with a chuck 82 for receiving the drill 71. The drill spindle 81 is driven by means of a pulley 83 and a belt 84 which also engages a pulley 85, Fig. 2, driven continuously by means of an electric motor 86. The motor 86 is mounted on a fixed platform 87 which is supported by means of spacer rods 88a on the platform 88 which extends around the table 32.

Referring back to Fig. 7, the spindle 81 is rotatable but axially fixed relative to a rack sleeve 89 which is guided for axial movement in the casing 80. The rack sleeve 89 meshes with a gear 89a supported for rotation on a shaft 90 extending transversely of the casing and carrying on one end a crank 91. The crank 91 is connected to a clevis 93 on the lower end of a push rod 94 having its upper end slidably received in a transverse plate 95 carried by and movable with the cross head 38. The push rod 94 has an adjustable collar 96 and it is engageable by the plate 95 during downward movement to rock the gear 89 and thereby advance the drill 71 radially of the table. To allow freedom of movement of the cross plate 95 relative to the push rod 94, a spring 97 is interposed between the upper surface of the cross plate and the head 98 on the upper rim of the push rod. With this arrangement, the drills 71 and 72 are advanced as the tapping spindles move downwardly so that four of the nuts are subjected to drilling operations while two of the nuts are being tapped or threaded. Also, the drills are retracted as the tapping spindles are retracted to enable the table to be indexed.

The tools 75 and 76 for forming and inserting the plugs in the drill holes of the nut will now be described. Inasmuch as these forming and inserting devices are identical, only the tool 76 will be described. The forming and inserting device 76 is best shown in Figs. 4 and 5 and is characterized by the ability to sever plugs of suitable dimensions from an elongated or continuous rod of nylon or similar resilient material. Heretofore, no effective means has been provided for handling nylon in continuous lengths and producing from it a satisfactory plug because of the inherent toughness and resistance to shearing which characterize nylon. The shearing and inserting mechanism 76 includes a base block 100 which is mounted on the fixed table 88 adjacent to work table 32. The block 100 carries at its upper end a tubular extension 101 having a bearing sleeve 102 therein, in which is reciprocably mounted a hollow feeding and guide tube 103 through which the nylon rod N passes. The inner end of the tube 103 carries a flared enlargement 104 having a generally conical or tapered inner surface 105. Bearing against this inclined surface are a plurality of chuck or gripping jaws 106, 107 which have complementally inclined outer surfaces and curved opposed inner surfaces which define a circular passage of slightly smaller diameter than the diameter of the nylon rod when the jaws are closed. The jaws are normally urged to the left to closed position by means of a helical spring 108 which engages their right hand end faces and the inner surface of a cap member 109 threaded into the end of the casing 104. The cap 109 has a central opening 110 permitting passage of the nylon rod therethrough.

The tubular member 103 is reciprocated axially by means of a bell crank lever 111 which is mounted by means of a pivot pin 113 on an arm 112 extending upwardly and to the left from the tubular extension 101. The lowermost arm 111a of the bell crank is connected by means of a pin and slot connection to a headed member 114 threaded on and fixed to the tubular guide member 103. As shown in Fig. 4, the tubular guide member is normally urged to the right to advance the rod N by means of springs 115 connected between the pins 117 on the member 114 and the pins 118 fixed to the extension 101. The tubular member 103 is moved to the left by means of a downwardly extending arm 119 fixed to the cross head 38. The arm 119 carries an adjustable set screw 120, the lower end of which engages the horizontally extending arm 111b of the bell crank 111 so that as the cross head moves down the tubular member 103 moves to the left. Upward movement of the cross head allows the spring 115 to move the tubular member 103 to the right at the same time advancing the nylon rod N because of the gripping engagement of the jaws 106 and 107 with the rod.

The nylon rod is advanced into a guide tube 121 which is also threaded into an extension 122 from the base block 100. The guide tube 121 is in alignment with the tubular member 103 and is also provided at its left-hand end with an oppositely acting rod gripping mechanism 123. This rod gripping mechanism includes a cap member 124 threaded on the end of the guide tube 121 and having inclined or tapered or conical surfaces 125 inclined in the same direction as the surface 105 of the opposed gripping device. Separate gripping jaws 126 engage the inclined surface and are urged toward each other to closed position by the action of the helical spring 127 engaging their right-hand ends and a shoulder 128 at the left-hand end of the tube 121. The action of the gripping member 124 is directly opposite to that of the gripping member carried by the tubular member 103, in that, it prevents the rod N from moving to the left with the tubular member 103 but permits the rod to be advanced to the right by means of the gripping member on the tubular member 103. In this way, reciprocation of the member 103 and the gripping device thereon feeds the rod N step-by-step to the right.

As the rod moves to the right it enters a die plate 130 at the right-hand end of the guide 121 and projects into a vertical slot 131 in the extension 122. The end of the rod N abuts against a stop screw 131a threaded through the outer wall 122a of the extension 122.

The slot 131 receives a shear member 132 which is reciprocated vertically by means of a push rod 133 connected at its upper end to the cross head 38. The lower end of the push rod 133 carries a clevis 134 which straddles the upper thickened end 135 of the shear member and is secured to it by means of a pin 136. The shear member 132 is provided with a hardened insert 137 having a central opening 138 to receive the end of the nylon rod when the shear member is in its highest position.

As the shear member is moved down by the descending cross head 38, the end section of the nylon rod is sheared off to form the plug 12 and moves downwardly with the shear member into alignment with a hollow tubular nipple 139 which has its inner end positioned in alignment with a hole in a nut 10 during a dwell period of the work table 32. The plug 12 is forced out of the opening 138 by means of a punch 140 and through the nipple 139 and into the hole 14, 15 drilled in the nut 12. The punch is positioned in the recessed end of a rod 141 which is slidable in a sleeve or bushing 142 mounted in an opening in the base plate 100 near its mid portion. The left-hand end of the plunger or shaft 141 is secured to a cross bar 143, which in turn is mounted on the piston rod 144 of an air cylinder 145. The air cylinder 145 is supplied with air from an outside source of air pressure. The air cylinder is controlled by means of a suitable selector valve 146a actuated by means of a cam 146b on the drive shaft 22 so that air pressure is supplied to the air cylinder to project the piston rod 144 quickly and then retract it while the cross head 38 is in its lowest position. In this way, when the shear member 132 with the severed plug in it comes into alignment with the nipple 139, the cylinder 145 is actuated to move the punch 140 to the right through the opening 138 thereby forcing the plug from the opening through the nipple 139 and forcing it under high pressure into the opening 14, 15 in the wall of the nut to seat the plug against the shoulder and partially extrude or deform it so that it extends into the threaded opening 11 of the nut, as shown in Fig. 1. The punch 140 is retracted before the cross head begins to move upwardly and thereby does not jam in the shear member 132.

The stroke of the punch 140 can be closely regulated by means of a set screw 147 screwed into the base 100 and engaging the end of the cross plate 143 at the limit of the outward stroke of the piston. The cylinder carries a safety switch 148 which stops the machine if the punch 140 is not fully returned. The switch is closed by engagement with the adjustable screw 149 carried by the cross bar 143. As shown in Figs. 1 and 5, the switch 148 is connected in parallel with a switch 148a between a power terminal T and the motor 23. The other terminal T' is connected to the motor. The switch 148a is opened and closed alternately by means of a cam 148b on the drive shaft 22. The switch 148a is maintained closed during the time that the switch 148 would normally be open due to movement of the punch 140 and opens shortly after the punch would be expected to return to close the switch 148. Therefore, if the punch does not return to close the switch 148, the circuit to the motor 22 is interrupted and the motor stops. The motor can be restarted by means of a manually actuated switch 148c in parallel with the switches 148 and 148a.

The limit of downward movement of the shear member 132 may be regulated by means of an adjustable screw 150 mounted in a lateral flange 151 on the clevis 134. The lower end of the screw is engageable with a hardened insert 152 screwed into an upwardly extending portion of the extension 122.

As explained above, after the plug 12 has been inserted in the nut, the metal around the outer end of the opening 14, 15 is peened over to retain the plug in position. This operation is accomplished by means of the punching or peening devices 77 and 78, which are identical. The peening device 78 will be described herein. The peening device or tool includes a base 160 mounted on the table 88 adjacent to and surrounding the work table 32. The base member has an upwardly and laterally curved arm 161 provided with a pivot pin 162 which pivotally supports an inverted generally U-shaped supporting member 163. The point of pivot connection between the arm 161 and the U member is near the top of the left-hand arm 164 of the member 163.

The right-hand, downwardly extending arm 165 of the member 163 carries an anvil member 166 which is used to back up the nut 10 and prevent it from being dislodged from the fixture 60 during the peening operation. The anvil 166 has a frusto-conical head portion 167 and hollow body portion 168 for receiving the cylindrical end portion 169 of an adjusting screw 170. The adjusting screw is threaded into a bore 171 in the arm 165 and may be locked in adjusted position by means of a lock nut 172. The anvil member 166 is retained in adjusted position by means of a locking screw 173 bearing against the side of the anvil member 166.

The base of the member 163 also carries a hold-down member 174 which engages the top of the nut 10 and prevents it from moving upwardly or turning over during the peening operation. The hold-down member 174 includes a cylindrical body portion 175 slidable in a bore 176 in the member 163. The member 174 has a reduced section 177 which extends upwardly from the cylindrical portion 175 through a hollow externally threaded sleeve 178. The sleeve 178 is threaded into the upper end of the bore 176 and is locked in position by means of a jam nut 179. The upper end 180 of the reduced portion 177 is threaded and receives a pair of jam nuts 181 to limit the downward movement of the member 175 with respect to the member 163.

A helical spring 182 engages the upper end of the thickened section 175 and the lower end of the sleeve 178 to normally urge the hold-down member 174 downwardly. The spring 182 also allows resiliently opposed upward movement of the member 174.

A rubber pressure block 183 mounted in a cup 184 on the end of a shaft 185 is threadedly connected to the lower end of the shaft 175. The threaded shaft 185 may be locked in adjusted position by means of jam nut 186.

The opposite arm 164 of the inverted U member carries a hydraulic ram or jack 189 including a cylinder 190 having a reciprocable piston 191 therein. The cylinder 190 includes a tubular sleeve 192 slidably receiving the piston rod 193 and an enlarged hollow cylindrical portion 194. The piston is joined at its inner end by means of a threaded connection 195 to the partially hollow piston 191. The tubular portion 192 fits in an aperture 196 in the arm 164 and is clamped in position by means of a pair of nuts 197 and 198 threaded on the threaded end portion 199 of the sleeve 192. The nuts 197 and 198 are jammed on the threaded portion 199 by means of one or more machine screws 200 passing through the nut 198 and screwed in the nut 197. The cylinder portion 194 abuts the opposite side of the arm 164 and is held against rotation by means of a key 201.

The piston 191 is slidable in a cylinder portion 202 which is screwed into the left-hand end of the cylinder portion 194 against an aligning and piston stopping ring 203. The ring 203 abuts against an annular shoulder 204 in the cylinder portion 194. Leakage between the cylinder portions 194 and 202 is prevented by means of a compression type packing gland 205.

The cylinder portion 202 and the cylinder portion 194 are provided with ports 206 and 207, respectively, on opposite sides of the piston 191 whereby liquid can be supplied to or discharged from the jack 189 to reciprocate the piston 191.

The piston carries a rubber buffer 208 mounted on a holder 209 which is secured to the left-hand end of the piston 191. The buffer prevents the piston from striking, metal to metal, against the end of the cylinder 190. The ram or jack 189 is connected to the hydraulic system S shown diagrammatically in Fig. 2 and is controlled by the selector valve 189a and the cam 189b on the drive shaft 22 to advance the punch 223 against the nut 10 during the dwell period of the table 32 and retract the punch.

The inverted U member is rocked into and out of operating position by means of a push rod 209 slidable in the cross head 38 and movable thereby by means of the springs 210 and 211 on opposite sides of the plate 95 which engage the retaining collars 212 and 213 fixed to the push rod 209. The push rod 209 is connected at its lower end by means of the clevis 214, and a cross pin 215 to an outstanding lug 216 on the right-hand end of the U member 163. During indexing movements of the table 32 and while the cross head 38 is in its upper position the hold-down member 174 is raised to release the nut and move the anvil 166 away from the nut.

Counterclockwise rocking movement of the U-shaped member 163 and the elements mounted thereon are limited by means of an adjusting screw 217 mounted in a flange 218 on the upper end of the arm 161. The screw is engageable with the upper surface of the member 163 to limit its counterclockwise movement. Clockwise rocking of the member is limited by means of a stop plate 219 carried by a stud 220 threaded into the table extension 88. The stop plate 219 is engageable with the left-hand end of the cylinder 190 and thereby limits the rocking of the U-shaped member in a clockwise direction. By suitably adjusting the stop plate 219 by means of the adjusting nuts 221 and 222 on the stud, the punch 223 which is mounted in a chuck 224 in the right-hand end of the piston rod 193 can be aligned accurately with the hole 14, 15 in the nut during the punching operation so as to peen the metal and thereby lock the plug 12 in position. The punch 223 may be of square cross section and is retained in the chuck 224 by means of a set screw 225, or the like.

After the nut has been peened to secure the plug 12 in the hole 14, 15, indexing of the table 32 brings the fixtures with the finished lock nuts into alignment with the chute 79 where the nuts may be removed from their fixtures either manually or, if desired, by means of ejecting plungers (not shown) carried by the table 32.

From the preceding description, it will be clear that a machine tool has been provided which is capable of producing finished lock nuts with great precision and at high production rate from untapped nut blanks fed to and handled automatically in the machine. By utilizing two feed hoppers and handling the nuts in pairs, the number of indexing operations of the machine are reduced and production rates are increased because no more time is required for machining operations on two of the nuts than would be required for conducting the same operations on a single nut.

While the above-described machine is the preferred embodiment, it will be understood that it is susceptible to many changes. For example, the machine incorporates, as indicated above, the Bodine tapping machine as a basic apparatus but other tapping machines and other forms of drive mechanisms for the cross head, the tapping spindles and the work table may be used, if desired. Moreover, other equivalent types of automatic drilling tools, ejectors and fixtures for supporting the nut blanks during the machining operations may be used, if desired. Therefore, the apparatus disclosed herein should be considered as illustrative and not as limiting the scope of the following claims.

I claim:

1. A device for peening lock nuts and the like comprising a movable work-supporting table, a plurality of fixtures on said table to receive nuts with the threaded apertures therein substantially perpendicular to said table, a supporting bracket adjacent to said table, a generally inverted U-shaped member pivotally supported between its ends on said bracket and having one free end overlying said table inwardly of said fixtures and the other free end disposed outwardly of said fixtures, an anvil member mounted in said one end for adjustment substantially parallel with said table to engage the innerside of a nut blank carried by a fixture, a hold down member adjustably and resiliently mounted in said inverted U-shaped member for movement substantially perpendicular to said table for engagement with the top of a nut blank in said fixture, a hydraulic jack mounted in said other end of said inverted U-shaped member for movement therewith, a punch actuated by said jack and in alignment with and opposing said anvil to engage and peen the opposite side of said nut blank from said anvil, and means for moving said inverted U-shaped member to engage said hold down member with a nut blank and disengage said hold down member from said nut blank.

2. The device set forth in claim 1 comprising adjustable means for limiting pivoting movement of said inverted U-shaped member.

3. In apparatus for making lock nuts comprising a rotary work table, a plurality of fixtures thereon for receiving nut blanks, means for rotating said table intermittently in a number of steps per revolution equal to one-half the number of fixtures on said table, a pair of nut blank feeding devices adjacent to the edge of said table for feeding nut blanks into fixtures spaced an odd number of fixtures apart around the table, a first pair of drilling means, one having a larger diameter drill than the other adjacent to the table, said drilling means being spaced an even number of fixtures apart to operate successively on the nut blanks supplied by one of said feeding devices and drill substantially radial holes therein having an outwardly facing shoulder, a second pair of drilling means, one having a larger diameter drill than the other, said drilling means being spaced an even number of fixtures apart and spaced from said first pair of drilling means a distance corresponding to the spacing between an odd number of fixtures to operate successively on the nut blanks supplied by the other feeding device and drill substantially radial holes therein, each having an outwardly facing shoulder, a pair of devices adjacent the table and spaced apart a distance equal to the spacing between an odd number of fixtures for cutting plugs of resilient material and inserting them in the holes in said nut blanks, and peening devices adjacent said table and spaced apart a distance corresponding to the spacing between an odd number of fixtures to peen each nut around the outer end of the hole.

4. An apparatus set forth in claim 3 including a pair of tapping means movable toward and away from said table and spaced apart a distance equal to the spacing between an odd number of fixtures to cut threads in a nut blank fed from each of said feeding means prior to insertion of the plugs therein.

5. The apparatus set forth in claim 3 in which each plug cutting and inserting device includes an axially reciprocable member, first means movable with said member to grip said rod and advance it in one direction and release said rod as said first means moves in the opposite direction, second means aligned with said first means to receive and grip said rod as said first means moves in said opposite direction and release said rod for advancing movement as said first means moves in said one direction, a cut-off member having an opening therein to receive the leading end of said rod, means to move said member between a first position in which said opening is alignment with said rod and a second position offset from said rod to shear off a section from the leading end of said rod, and a reciprocable punch member movable through said opening when the latter is in said second position to eject said section from said opening.

6. The apparatus set forth in claim 3 in which the plug cutting and inserting device includes a tubular guide member to receive a rod of resilient material, a shear member adjacent to one end of said guide member and movable substantially perpendicular to the axis of said guide member, said shear member having an opening therein to receive the leading end of said rod, a first gripping member carried by said guide member to receive said rod and permit it to move toward said shear member and prevent movement of said rod away from said shear member, a second oppositely acting gripping member movable toward and away from said guide member, said second gripping member receiving and gripping said rod to advance said rod through the guide member, during movement toward the latter, and releasing said rod during movement away from said guide member, a reciprocable punch member adjacent to said guide member, means to move said shear member to sever from said rod the end of the latter extending into said opening and move said opening into alignment with said punch, and means to reciprocate said punch to move it through said opening to eject the severed end from the opening and withdraw the punch from the opening.

7. The apparatus set forth in claim 6 in which each of the gripping means comprises a casing having inclined inner surfaces, a plurality of jaws in said casing having inclined outer surfaces complemental to said surfaces of said casing and opposed inner surfaces collectively defining an opening for receiving said rod, and spring means engaging said jaws and urging them lengthwise of said inclined surfaces and toward each other and the rod, and in which the inclined surfaces of the casing of the first gripping means are inclined in the same direction as the inclined surfaces of the second gripping means.

References Cited in the file of this patent

UNITED STATES PATENTS

| | | |
|---|---|---|
| 805,170 | Thomas | Nov. 21, 1905 |
| 1,921,403 | Bell et al. | Aug. 8, 1933 |
| 2,070,032 | Swanstrom | Feb. 9, 1937 |
| 2,202,044 | Chambers et al. | May 28, 1940 |
| 2,499,104 | Lovell | Feb. 28, 1950 |
| 2,593,715 | Adler et al. | Apr. 22, 1952 |
| 2,594,201 | Nasmith et al. | Apr. 22, 1952 |
| 2,643,403 | McBlane et al. | June 30, 1953 |